Figure 1:
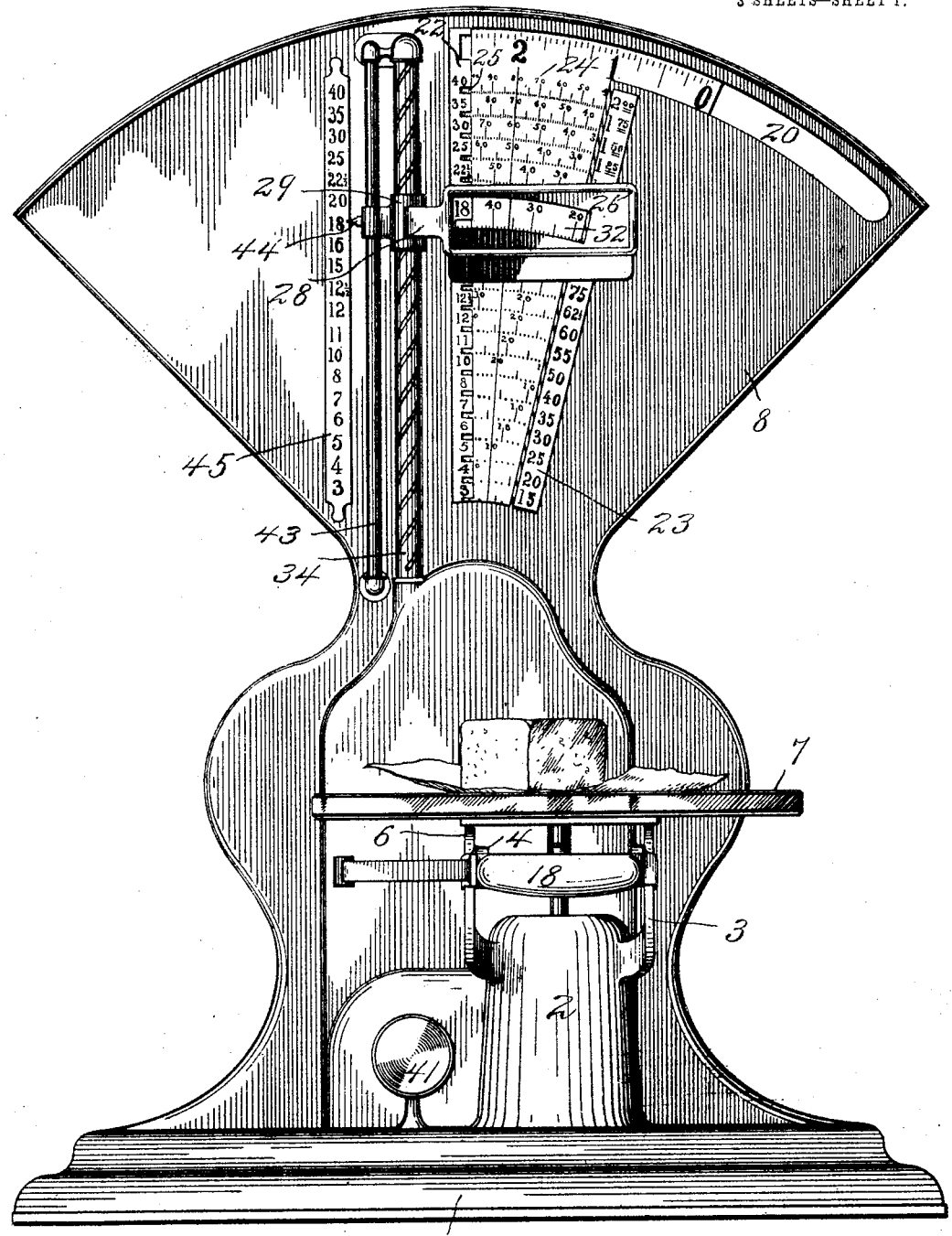

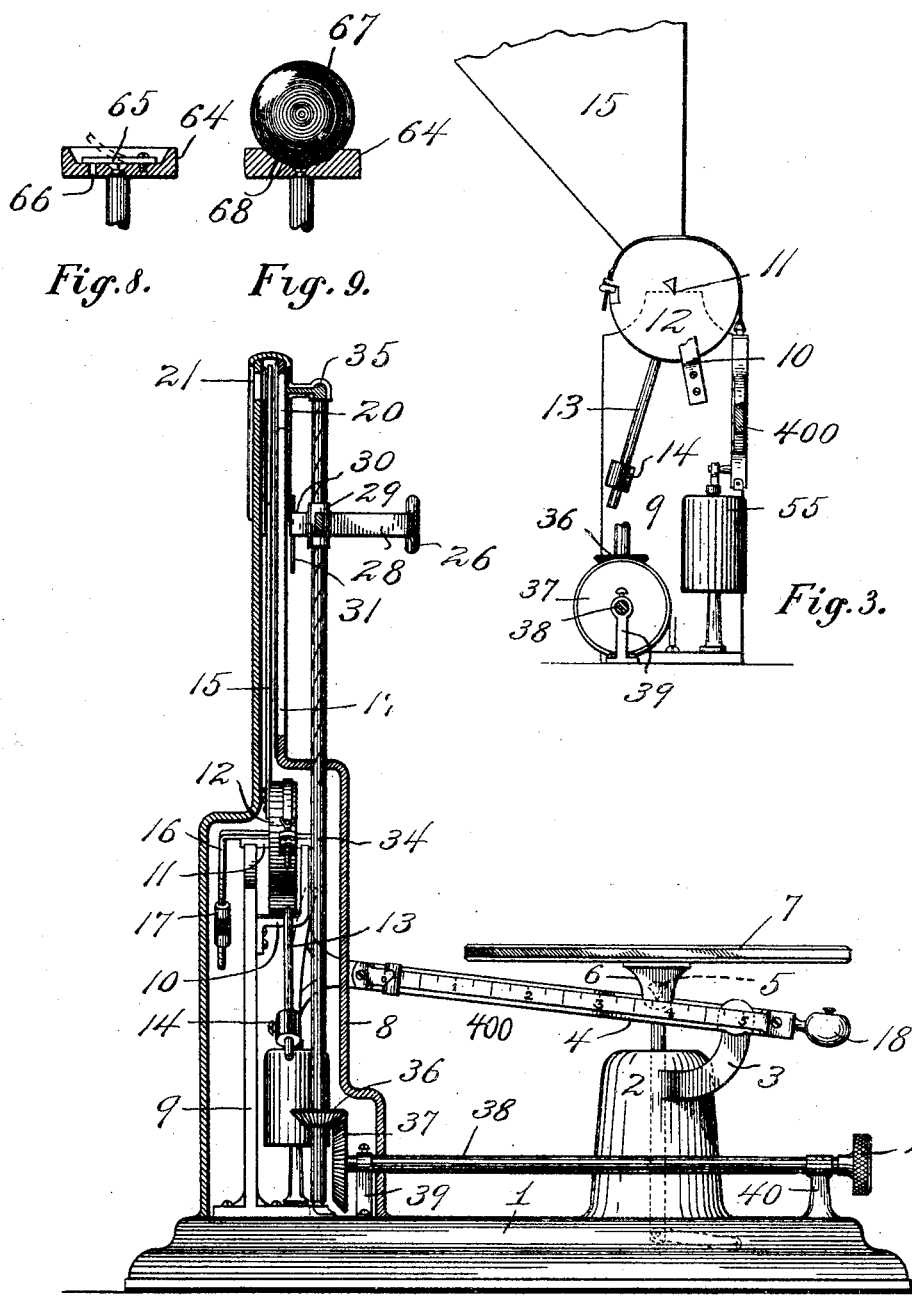

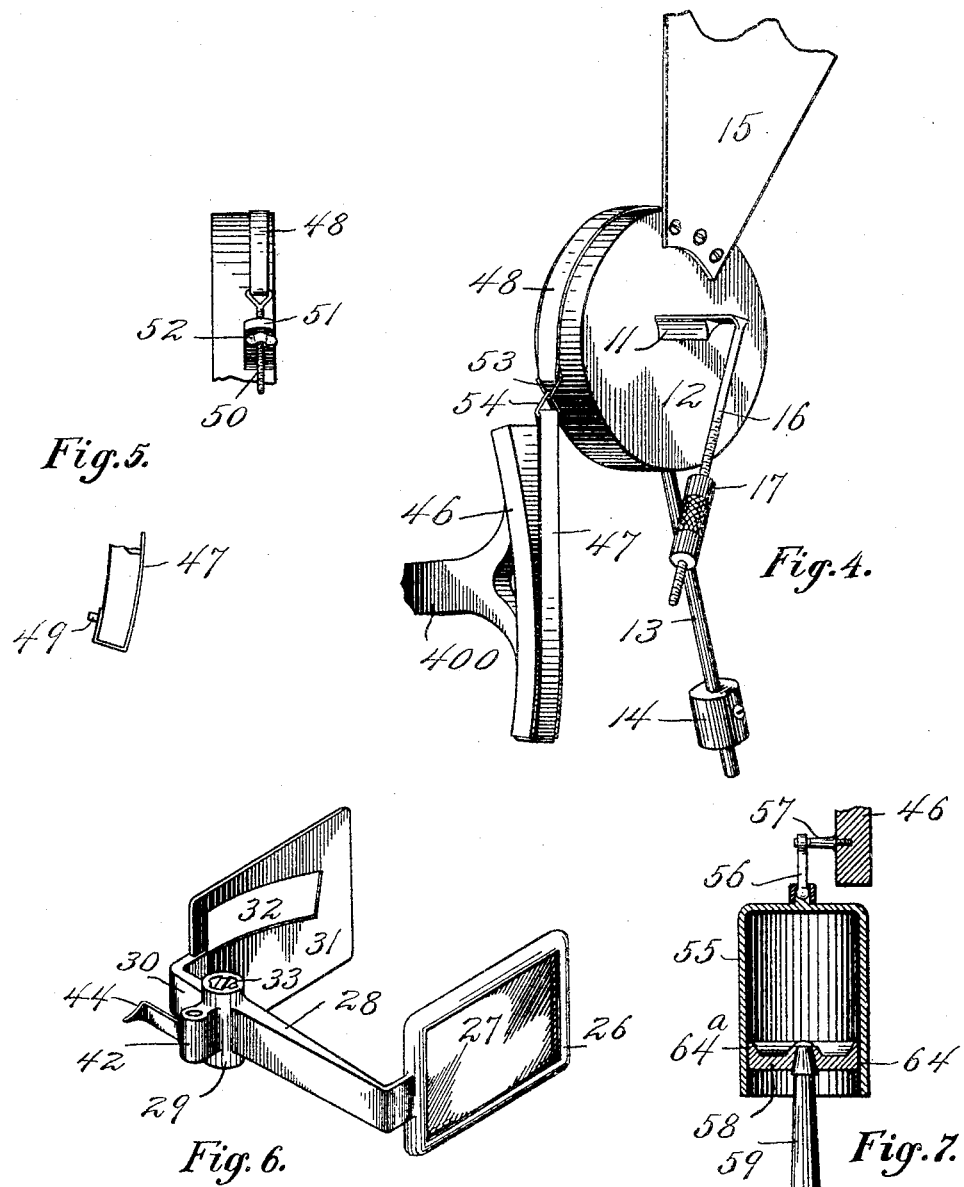

UNITED STATES PATENT OFFICE.

HENRY S. HALLWOOD, OF COLUMBUS, OHIO.

PENDULUM COMPUTING-SCALE.

No. 808,048.  Specification of Letters Patent.  Patented Dec. 19, 1905.

Application filed February 9, 1905. Serial No. 244,910.

*To all whom it may concern:*

Be it known that I, HENRY S. HALLWOOD, residing at Columbus, in the county of Franklin and State of Ohio, have invented a certain new and useful Improvement in Pendulum Computing-Scales, of which the following is a full, clear, and exact description, reference being had to the accompanying drawings.

Considerable difficulty has been experienced in the reading of pendulum computing-scales, due to the difficulty of correctly and positively finding the exact intersection of the price-column and value-indications. A further objectionable feature of such scales is the excessive vibration of the scale-beam and the movable indicating parts when an article to be weighed is placed on the pan or is removed after weighing. It is attempted to overcome this vibration by the employment of an oil-well dash-pot connected with one of the movable parts; but such dash-pots cause inaccurate and unreliable results, owing to the fact that the viscosity of the oil therein varies with the quality of oil employed, as well as with the changes of temperature, which makes it necessary to provide and operate oil-valves to regulate the friction according to the weather. Each change of temperature brings a changed condition of viscosity. When the oil increases in temperature, the vibrations increase excessively. When the temperature decreases, the oil congeals and destroys the accuracy and sensitiveness of the scale. Under such conditions both underweight and overweight are possible. The vibrations are stopped by the resistance, adhesiveness, or stickiness of the oil used, thereby holding the indicator out of its true position and equilibrium.

It is the object of my invention to provide a scale of the pendulum type that will avoid these defects and be uniformly accurate under all conditions of temperature and weather by substituting for the objectionable oil-well dash-pot an air cylinder or governor of simple and effective construction which will not require any attention or adjustment. It is obvious that there can be no adhesiveness in the air to hold the indicating mechanism out of its true position and equilibrium.

A further object of my invention is to provide a magnifying-glass to magnify and facilitate the reading of the figures and a movable-at-will shutter device that will direct and confine the clerk's vision exclusively to the value of the article weighed when its value is multiplied by its price per pound, and generally to improve the construction and operation of such scales by simplifying and improving the structural features thereof.

Generally speaking, the invention may be defined as consisting of the combinations of elements embodied in the claims hereto annexed.

Referring to the drawings, Figure 1 is an elevation of the scale viewed from the operator's side of the same. Fig. 2 represents a view, partly in section and partly in elevation, taken at right angles to the plane of Fig. 1. Fig. 3 represents an elevation of the parts within the casing, the casing being removed and the scale-beam and the shaft which operates the shutter and magnifying-glass being shown in section. Fig. 4 represents a perspective detail of the chart-drum, showing the pendulum, chart, counterbalancing weight, and the proximate end of the scale-beam. Fig. 5 represents a detail view of a portion of the chart-drum and the adjacent portion of the scale-beam, showing the manner of attaching the bands thereto. Fig. 6 represents a perspective detail of the magnifying-glass and shutter. Fig. 7 represents a vertical sectional view of the air-pump or governor which obviates the oscillation of the scale-beam, chart, and drum; and Figs. 8 and 9 are sectional details of modified forms of the air-pump piston-head.

Describing the parts by reference-numerals, 1 represents the base of the scale. The base supports at one end the pillar 2, which carries the brackets 3, to which are pivoted the branches 4 4 of the scale-beam 400, the upper edge of said branches being provided with the usual agate bearings for receiving the knife-blade pivots 5, carried by the brackets 6, which depend from the scale pan or platform 7. At the opposite end of the platform is supported the casing 8, within which the chart, chart-drum, air-pump, and part of the mechanism for raising and lowering the magnifying glass and shutter are located. Supported by the base within the casing is the standard 9, having secured thereto the bracket 10. The upper ends of said standard and bracket are provided with agate bearings for the knife-edge pivot 11 of the drum 12, which carries the scale-chart. Projecting from said drum is the pendulum-rod 13, having thereon the adjustable weight 14. Projecting also from said drum in the line of the center of gravity of the chart 15 is the arm 16, having a weight 17 threaded thereon for adjustment. I have shown this arm as projecting from one end of the knife-edge bearing 11; but it will be obvious that it may be connected directly to the drum without affecting the mode of operation. The purpose of the rod 16 and weight 17 is to assist in setting the scale to zero position when no weight is on the platform. This result is facilitated by the placing of shot or similar finely-divided material in the receptacle 18, supported by the ends of the branches 4 of the scale-beam to bring the scale approximately to zero position, after which the weight 17 may be screwed along the rod to complete the adjustment. After the adjustment has been accurately made the weight 17 is sealed in position. The casing is provided on the operator's side of the same with a vertical opening 19, the sides of said opening extending radially of the chart and the size of the opening being sufficient to expose a considerable portion of the chart. On a five-pound chart the opening may correspond to one and one-half pounds on the chart, as shown in the drawings. Adjacent the upper end of the casing there are provided arc-shaped slots 20 21 for the reading of the weight-indicating figures on the chart by the operator and the customer, respectively. At one edge of the vertical opening 19 is arranged the vertical rate-column 22, having thereon figures indicating the prices per pound of the articles weighed. At the other edge of said opening is the column 23, having thereon figures representing multiples of the corresponding figures appearing on the scale 22. With the scale illustrated herein I prefer to employ a five-pound chart, wherefore the figures on the column 23 are five times the value of the corresponding figures on the column 22. The chart is provided with a series of concentric rows of graduations 24, having figures representing the totals for the number of pounds and fractions thereof corresponding to the rates on the column 22. This column is provided with notches 25, permitting an inspection of the graduations beyond the reading-point, said reading-point being the intersection of the line of the edge of the column and a row of graduations, thereby facilitating the observation of close readings. In making readings exceeding the capacity of the chart—in this instance five pounds—the proper total in the column 23 is added to the total on the arc corresponding to the price per pound of the article weighed.

As scales of the type herein shown are frequently placed where the light is poor or are operated by persons having defective eyesight, I provide my scale with a magnifying device for observing the readings and with a shutter whereby the observation is restricted to the particular transactions under consideration. This magnifying device consists, preferably, of a rectangular frame 26, having a lens 27 therein. The frame is carried by an arm 28, projecting from a nut 29. Opposite said frame and carried by an arm 30 is the shutter 31, having therein an arc-shaped slot 32, corresponding in curvature to the rows of graduations on the chart. This slot is of sufficient extent to permit the observation of a considerable portion of the row of graduations adjacent the vertical column 22. The nut 29 is provided with a coarse internal thread 33, engaging a corresponding thread on the worm-shaft 34. This shaft is spaced from the casing a sufficient distance to permit the shutter to be reciprocated between it and the casing, said shaft being rotatably supported between a bracket 35, projecting from the upper portion of the casing, and a bearing in the base of the standard 9. Near its lower end, within the casing, the shaft is provided with a bevel-gear 36, engaged by a corresponding bevel-gear 37 on the shaft 38. This latter shaft is supported by brackets 39 40, carried by the base 1, the former being within the casing and the latter near the operator's end of the base. The outer end of the shaft 38 is provided with a small hand-wheel 41, by means of which the operator rotates said shaft and raises and lowers the magnifying-glass and the shutter. A sleeve 42 projects from the nut 29 and embraces a rod 43, parallel with and adjacent the worm-shaft, to prevent rotation of the nut and the attached parts on said shaft when the shaft is rotated. Projecting toward the casing from the sleeve is the index or pointer 44. This index coöperates with a vertical column 45, having a scale thereon corresponding to the scale 22. To observe a reading of the scale by the magnifying-glass, the operator rotates the shaft 38 in the appropriate direction, elevating or lowering the magnifying-glass and the shutter until the index or pointer is at the figure on the column 45 corresponding to the rate per pound of the article being weighed. The total price of said article may then be read through the magnifying-glass and the slot in the shutter. As the scale may be operated under circumstances not requiring the employment of the magnifying-glass and shutter therewith, the threaded part of the worm-shaft 34 and the rod 43 are extended below the opening 19 a sufficient distance to permit said glass and shutter to occupy a position below said opening, whereby the scale may be operated in the ordinary manner without obstructing the view of the chart and price-columns by such parts.

As hereinbefore stated, the chart 15 is carried by the drum 12, being secured thereto, as by screws. This drum is rocked on its pivot 11 by the scale-beam, to which it is connected as follows: The adjacent end 46 of the scale-beam is arc-shaped, the center of curvature of said arc being the pivotal point of said beam. As a means for connecting said drum and beam I preferably employ the metallic bands or ribbons 47 48, the former being carried by the arc-shaped end of the scale-beam, the latter by the drum. The end of the band or ribbon 47 may be secured by means of a pin 49 on the rear side of the arc 46, passing through a perforation in such band or ribbon. The end of the band or ribbon 48 is adjustably secured to the drum by by means of a threaded bolt 50, extending through a lug 51 on the drum, and an adjusting-nut 52 for said bolt. As the planes of movement of said beam and drum are at right angles to each other, the bands or ribbons are connected by means of the links 53 54.

To permit quick and accurate reading of the scale, it is important that means should be provided for reducing to a minimum the vibration of the chart and its drum, due to the inertia of the said parts. For this purpose I connect the drum, through the scale-beam, with an air-pump. The pump comprises a cylinder 55, pivoted to a link 56, which is pivotally supported from an arm 57, projecting laterally from the arc-shaped end 46 of the scale-beam. This cylinder reciprocates on a piston-head 58, carried by the rod 59 and shown as supported by the base of the standard 9. As will appear more particularly from Fig. 7, the rod 59 is adjustably supported from said base by means of a reduced threaded portion 60, extending through an enlarged opening 61 in the base and provided with a nut 62 and washer 63. The relative sizes of the reduced portion 60 and opening 61 are such as to permit of the adjustment necessary to maintain a proper relation between the cylinder and the piston-head. The diameter of the piston-head is sufficiently smaller than the internal diameter of the cylinder to permit the air to pass slowly between these parts, thereby reducing to a minimum the vibration of the beam and of the connected drum and chart when an article is placed on or removed from the platform. The upper surface of the piston-head is preferably dished or concaved, as shown in Figs. 7 and 8, and the rim 64ª adjacent the periphery of the piston-head is inclined upwardly toward the wall of the cylinder. As the cylinder descends this produces an eddying of the air within the cylinder above the piston-head, thereby retarding the flow of air between the piston-head and the cylinder-wall, with a corresponding increase in efficiency of the air-pump or governor. As will appear more particularly from Figs. 7, 8, and 9, the side edge 64 of the piston-head is rounded to permit of the tilting of the cylinder without restricting the flow of air between the same and the piston-head or without causing their parts to bind by reason of such tilting, the curvature of said edge preferably corresponding to that of an arc described from the pivot of the scale-beam as a center. In Figs. 8 and 9 I have shown the piston-head as provided with a valve. In the former figure the valve is a flap 65 of suitable material, as rubber, secured to the upper surface of the piston-head and covering the opening 66 therethrough. In the latter figure the valve is a ball-valve 67, preferably of rubber and covering the inclined opening 68, extending through the piston-head. This arrangement permits air to enter the cylinder freely when the article weighed is removed from the platform and permits the weighing-beam and chart to return quickly to the normal or zero position. When the article is placed on the platform to be weighed, the compression of the air within the cylinder above the piston-head and the weight of the valve closes said valve, compels the escaping air to pass slowly between the piston-head and cylinder, and thus reduces to a minimum the vibrations of the scale-beam and chart.

I am aware of the fact that oil-well dash-pots have been employed with scales to obviate the vibration of the beam and movable indicating parts; but these dash-pots are necessarily unreliable to give uniform results, because a change in the grade of oil employed, the evaporation of the more volatile constituents of the oil, and changes of temperature will affect the viscosity of the oil, rendering its rate of flow uncertain and making it necessary to devote constant attention to the regulation of the oil-valves to regulate the friction according to such variations in the condition of the oil. The employment of an air-pump or governor in place of an oil-well dash-pot not only obviates the above objectionable features, but permits the employment of a simple construction for producing such important result. This dash-pot is shown, described, and claimed in my application Serial No. 283,619, filed October 20, 1905.

It is desirable to space the graduations on the chart uniformly; but as the movement of the pendulum, due to varying weights placed on the platform, is not exactly proportional to the arc of the circle described by the end of the pendulum it is necessary to make the drum eccentric or cam-shaped in outline, as shown particularly in Fig. 3.

Many modifications may be made in the embodiment of my invention without departing from the spirit thereof, and I do not propose to be limited to details of construction shown in the embodiment herein disclosed except as such details may be positively included in the claims hereto annexed or may be rendered necessary by the prior state of the art.

Having thus described my invention, what I claim as new, and desire to secure by Letters Patent, is—

1. In a computing-scale, the combination of a casing having an opening therein, a chart in said casing having a series of value-indicating graduations thereon, a shutter constructed to limit the vision to graduations corresponding to a certain transaction only, and mechanism for operating said shutter, substantially as specified.

2. In a computing-scale, the combination of a graduated member, a shutter constructed to limit the vision to a certain graduation or set of graduations corresponding to a certain transaction only, means for supporting said shutter out of operative relation to said member, and means for operating said shutter to place it in operative relation to a desired graduation or set of graduations, substantially as specified.

3. In a computing-scale, the combination of a chart having graduations thereon, a shutter constructed to limit the vision to a limited number of graduations corresponding to a certain transaction only, means for supporting said shutter out of operative relation to said chart, and mechanism for operating said shutter to place it in operative relation to said chart, substantially as specified.

4. In a computing-scale, the combination of a casing having an opening therein, a guide adjacent said opening, a chart within said casing and having a set of value-indicating graduations thereon, a shutter mounted on said guide and constructed to limit the vision to graduations corresponding to a certain transaction only, and mechanism for reciprocating said shutter on said guide, substantially as specified.

5. In a computing-scale, the combination of a casing having an opening therein, a graduated rate-column parallel with an edge of said opening, a chart within said casing having series of value-indicating graduations thereon corresponding to the graduations on the said column, a shutter mounted adjacent said opening and constructed to limit the vision to graduations on said column and chart corresponding to a certain transaction only, and mechanism for operating said shutter, substantially as specified.

6. In a computing-scale, the combination of a casing having an opening therein, a graduated rate-column adjacent said opening, a second column parallel with said rate-column and having graduations corresponding to those on said rate-column, a chart within said casing having series of value-indicating graduations thereon corresponding to the graduations on said rate-column, a shutter mounted adjacent said opening and constructed to limit the vision to graduations corresponding to a certain transaction only, mechanism for operating said shutter, and an index coöperating with the graduations on said second column, substantially as specified.

7. In a computing-scale, the combination of a movable chart having series of value-indicating graduations thereon, a fixed rate-column adjacent said chart, a magnifying-glass mounted in operative relation to said chart and said rate-column, and mechanism for moving said magnifying-glass relatively to the graduations on said column and said chart, substantially as specified.

8. In a computing-scale, the combination of a casing having an opening therein, a chart within said casing having a series of value-indicating graduations thereon, a rate-column adjacent the edge of said opening, a magnifying-glass mounted in operative relation to said column and chart, mechanism for moving said magnifying-glass relatively to the graduations on said column and chart, and means for restricting the vision through the magnifying-glass to graduations on said column and chart corresponding to a particular transaction only, substantially as specified.

9. In a computing-scale, the combination of a chart having thereon series of value-indicating graduations, a graduated rate-column adjacent said chart, a combined magnifying-glass and shutter in operative relation to said chart and column, the shutter being constructed to confine the vision to graduations on said chart and column corresponding to a particular transaction only, and mechanism for moving such magnifying-glass and shutter relatively to such graduations, substantially as specified.

10. In a computing-scale, the combination of a graduated member, a magnifying-glass and shutter adapted to magnify the graduations and to limit the vision to a graduation or graduations corresponding to a certain transaction only, and mechanism for moving said glass and shutter with reference to the graduations on such member or to leave such glass and shutter out of operative relation to said member, substantially as specified.

11. In a computing-scale, the combination of a casing having an opening therein, a graduated rate-column at an edge of said opening, a chart within said casing having series of value-indicating graduations thereon, a guide-rod adjacent and parallel to such edge of said opening, a shutter in close proximity to said casing and having an opening therein adapted to limit the vision to graduations on the column and chart corresponding to a particular transaction only, a magnifying-glass in operative relation to said shutter and chart, said glass and shutter being mounted on said guide, and mechanism for moving said glass and shutter along said guide, substantially as specified.

12. In a computing-scale, the combination of a graduated member, a geared worm-shaft adjacent said member, a magnifying-glass carried by said worm-shaft, a shaft having a gear meshing with the gear on the worm-shaft, and means for preventing the rotation of said glass by the rotation of the worm-shaft, substantially as specified.

13. In a computing-scale, the combination of a graduated member, a geared worm-shaft adjacent said member, a shutter carried by said worm-shaft, a shaft having a gear thereon meshing with the gear on the worm-shaft, and means for preventing the rotation of the shutter by the rotation of the worm-shaft, substantially as specified.

14. In a computing-scale, the combination of a graduated member, a geared worm-shaft adjacent said member, a magnifying-glass and a shutter carried by said worm-shaft, a shaft having a gear thereon meshing with the worm-shaft gear, and means for preventing the rotation of said glass and shutter by the rotation of said worm-shaft, substantially as specified.

15. In a computing-scale, the combination of a graduated member, a shutter having a slot therein for restricting the vision to graduations corresponding to a certain transaction only, mechanism for operating said shutter, and a magnifying-glass for observing the graduations through the shutter, substantially a specified.

16. In a computing-scale, the combination of a movable indicating member and a fixed indicating member coöperating to indicate the weight and value of commodities at different prices per pound, a rotary drum by which said movable member is carried, a pendulum carried by said drum, a scale-beam extending at right angles to the head of said drum, a flexible band or ribbon secured to said drum and supported on the outer surface thereof, a flexible band or ribbon connected to the scale-beam, and means, as links, connecting said bands or ribbons.

17. In a computing-scale, the combination of a casing, a rotary drum, a computing chart or table carried thereby, said chart or table being provided with series of concentrically-arranged graduations and numerals indicating different weights of commodities and the values of such weights at different prices, a pendulum carried by said drum, the said drum, chart, and pendulum being within said casing, a scale-beam projecting within said casing, the end of such scale-beam which projects within the casing being arc-shaped, a band or ribbon connected to such arc-shaped end of the scale-beam, a band or ribbon secured to said drum and supported on the outer surface thereof and connected to the former band or ribbon, said casing being provided with a slot for permitting the observation of the chart and with a rate-column at one edge of said slot having numerals thereon corresponding to the series of graduations and numerals on the chart or table, substantially as specified.

18. In a computing-scale, the combination of a casing, a rotary drum, a computing chart or table carried thereby, said chart or table being provided with series of concentrically-arranged graduations and numerals indicating different weights of commodities and the values of such weights at different prices, a pendulum carried by said drum, the said drum, chart, and pendulum being within said casing, a scale-beam projecting within said casing, the end of such scale-beam which projects within the casing being arc-shaped, a band or ribbon connected to the lower portion of such arc-shaped end of the scale-beam, a band or ribbon secured to said drum and supported on the outer surface thereof, means for connecting said bands or ribbons, said casing being provided with a slot or opening for permitting the observation of the chart therein, substantially as specified.

19. In a computing-scale, the combination of a casing, a rotary cam-shaped drum, a computing chart or table carried thereby, said chart or table being provided with series of concentrically-arranged graduations and numerals indicating different weights of commodities and the values of such weights at different prices, a pendulum carried by said drum, the said drum, chart, and pendulum being within said casing, a scale-beam projecting within said casing, the end of such scale-beam which projects within the casing being provided with an elongated arc-shaped surface, and a band or ribbon connected to the lower portion of such arc-shaped end of the scale or beam and extending over the cam-shaped surface of the drum and connected to said drum, said casing being provided with a slot or opening for permitting the observation of the chart therein, substantially as specified.

20. In a computing-scale, the combination of a casing, a rotary drum, a computing chart or table carried thereby, said chart or table being provided with series of graduations and numerals indicating different weights of commodities and the values of such weights at different prices, a pendulum carried by said drum, the said drum, chart, and pendulum being within said casing, a scale-beam projecting within said casing at one side of said drum and at right angles to the plane thereof, a band or ribbon connected to the end of the scale-beam which projects within the casing, a band or ribbon connected to the said drum and supported on the outer surface thereof, and means for connecting said bands or ribbons, said casing being provided with a slot or opening for permitting the observation of said chart therein, substantially as specified.

In testimony whereof I affix my signature in the presence of two witnesses.

HENRY S. HALLWOOD.

Witnesses:
A. L. PHELPS,
M. B. SCHLEY.